(12) United States Patent
Vitanov et al.

(10) Patent No.: US 11,834,008 B2
(45) Date of Patent: Dec. 5, 2023

(54) ROTATING GLASS SENSOR CLEANING SYSTEM AND METHODS OF OPERATION

(71) Applicant: Pony AI Inc., Grand Cayman (KY)

(72) Inventors: Anatolii Vitanov, Fremont, CA (US); Peter G. Diehl, Shanghai (CN)

(73) Assignee: Pony AI Inc., Grand Cayman (KY)

( * ) Notice: Subject to any disclaimer, the term of this patent is extended or adjusted under 35 U.S.C. 154(b) by 715 days.

(21) Appl. No.: 16/783,515

(22) Filed: Feb. 6, 2020

(65) Prior Publication Data

US 2021/0245714 A1   Aug. 12, 2021

(51) Int. Cl.
| | |
|---|---|
| *B60S 1/08* | (2006.01) |
| *G01D 11/24* | (2006.01) |
| *G02B 27/00* | (2006.01) |
| *A47L 9/28* | (2006.01) |
| *A47L 9/04* | (2006.01) |
| *B60S 1/56* | (2006.01) |

(52) U.S. Cl.
CPC ........... *B60S 1/0848* (2013.01); *A47L 9/0466* (2013.01); *A47L 9/281* (2013.01); *B60S 1/56* (2013.01); *G01D 11/245* (2013.01); *G02B 27/0006* (2013.01)

(58) Field of Classification Search
None
See application file for complete search history.

(56) References Cited

U.S. PATENT DOCUMENTS

| | | | |
|---|---|---|---|
| 8,012,250 B2 | 9/2011 | Hwang et al. | |
| 9,399,284 B2 | 7/2016 | Kwon et al. | |
| 9,607,242 B2 | 3/2017 | Lavoie | |
| 10,307,800 B1 | 6/2019 | Lombrozo | |
| 2007/0217782 A1 | 9/2007 | McCutchen | |
| 2011/0266375 A1 | 11/2011 | Ono et al. | |
| 2014/0036132 A1 | 2/2014 | Pawlowski | |
| 2015/0185592 A1 | 7/2015 | Eineren et al. | |
| 2015/0298657 A1 | 10/2015 | Kanter et al. | |

FOREIGN PATENT DOCUMENTS

| | | |
|---|---|---|
| DE | 102017221494 A1 | 6/2019 |
| JP | 2008288720 A | 11/2008 |
| WO | 2005096091 A1 | 10/2005 |

OTHER PUBLICATIONS

DE 102017221494 A1 translation, Device Designed for Environment Detection, Holleczek 2019 (Year: 2019).*
International Search Report and Written Opinion for PCT/US21/16765 dated Apr. 26, 2021, 10 pages.

* cited by examiner

Primary Examiner — Cristi J Tate-Sims (57) ABSTRACT

Described herein are sensor assembly cleaning systems and apparatuses that are adapted to rotate a transparent surface of a sensor assembly independently of a housing of the sensor assembly in order to disperse water, moisture, debris, or the like from the surface. The transparent surface may be a glass window that provides a camera of the sensor assembly with a field-of-view of an external environment. Sensor data captured from various on-board vehicle sensors such as moisture data, image data, vehicle velocity data, or the like can be evaluated against various criteria to determine when and for how long to rotate the transparent surface. Sensor data can be evaluated over a period of time to identify patterns or trends relating to one or more vehicle parameters. An activation schedule for initiating and ceasing rotation of the transparent surface can be determined based on such patterns/trends.

10 Claims, 6 Drawing Sheets

ROTATING GLASS SENSOR CLEANING SYSTEM AND METHODS OF OPERATION

The present invention relates generally to sensor assembly cleaning systems and apparatuses and methods of operation thereof, and more particularly, in some embodiments, to sensor assembly cleaning systems and apparatuses adapted to rotate a transparent surface of a sensor assembly to remove liquid and/or debris from the surface.

BACKGROUND

A vehicle, such as an autonomous vehicle, includes a myriad of sensors that provide continuous streams of sensor data captured from the vehicle's surrounding environment. Such sensor data enables an autonomous vehicle to perform a number of functions that would otherwise be performed by a manual human operator including various vehicle navigation tasks such as vehicle acceleration and deceleration, vehicle braking, vehicle lane changing, adaptive cruise control, blind spot detection, rear-end radar for collision warning or collision avoidance, park assisting, cross-traffic monitoring, emergency braking, and automated distance control.

A vehicle such as an autonomous vehicle can include a variety of different types of on-board sensors including, for example, cameras, light detection and ranging (LiDAR) systems, radar systems, Global Positioning System (GPS) devices, sonar-based sensors, ultrasonic sensors, accelerometers, gyroscopes, magnetometers, inertial measurement units (IMUs), and far infrared (FIR) sensors. On-board vehicle sensors disposed on an exterior of a vehicle may be provided in or integrated with protective housing to protect the sensors from damage from the elements. The housing, however, can be subjected to environmental elements such as rain, heat, wind, or the like that can impede the ability of sensors encased in the housing to perform their functions. Technical solutions that mitigate the effect of such factors on sensor performance and enhance the functional capabilities of sensors are described herein.

SUMMARY

In an example embodiment, an apparatus includes a support component adapted to support a transparent surface of a sensor housing and a component adapted to provide motive power to the support component to cause the transparent surface to rotate. In an example embodiment, the component adapted to provide the motive power is an electric motor assembly.

In an example embodiment, the apparatus further includes a gear coupled to the support component. In an example embodiment, the electric motor assembly includes a gearset adapted to mesh with the gear to cause the motive power to be transferred from the gearset to the support component via the gear.

In an example embodiment, the support component is a bearing and the transparent surface is mounted to the bearing. In an example embodiment, the bearing is mounted to the sensor housing or to a component attached to the sensor housing.

In an example embodiment, the sensor housing is a camera housing that encloses a multiple cameras and the transparent surface provides at least one of the cameras with a field-of-view of an environment external to the camera housing. In an example embodiment, the camera housing forms part of a sensor assembly that is mounted on a vehicle and the transparent surface is a glass camera window that provides the at least one camera with the field-of-view of the environment external to the vehicle.

In an example embodiment, the transparent surface is adapted to rotate independently of the sensor housing. In an example embodiment, rotation of the transparent surface causes at least one of liquid or debris to disperse from the transparent surface.

In an example embodiment, the support component and the component adapted to provide the motive power are located so as to provide a substantially unobscured field-of-view through the transparent surface for a sensor housed in the sensor housing.

In an example embodiment, a computer-implemented for controlling a sensor housing cleaning system includes receiving sensor data from one or more sensors associated with a vehicle and determining, based at least in part on the sensor data, a level of obscurement of a transparent surface of a sensor housing associated with the vehicle. In an example embodiment, the method further includes determining that the level of obscurement exceeds a threshold level and sending, responsive at least in part to determining that the level of obscurement exceeds the threshold level, an actuation signal to the sensor housing cleaning system to cause the transparent surface to rotate.

In an example embodiment, sending the actuation signal to the sensor housing cleaning system includes sending the actuation signal to a component of the sensor housing cleaning system that is adapted to provide motive power to cause the transparent surface to rotate. In an example embodiment, the component that is adapted to provide the motive power is an electric motor assembly. In an example embodiment, the electric motor assembly is adapted to provide the motive power to a support component to which the transparent surface is mounted such that the motive power is transferred to the transparent surface through the support component. In an example embodiment, the support component is a bearing and the bearing and the transparent surface are adapted to rotate independently of the sensor housing.

In an example embodiment, the sensor data includes at least one of moisture data, image data, or vehicle velocity data. In an example embodiment, determining the level of obscurement of the transparent surface includes determining, based at least in part on the moisture data, at least one of: i) an amount of moisture present on the transparent surface or ii) a percentage of the transparent surface that is obscured by the moisture.

In an example embodiment, the image data includes an image captured by a camera enclosed in the sensor housing through the transparent surface. In an example embodiment, determining the level of obscurement of the transparent surface includes comparing an image quality of the image to an image quality of a baseline unobscured image.

In an example embodiment, a method for controlling a sensor housing cleaning system further includes determining, based at least in part on the vehicle velocity data, a velocity of the vehicle, determining that the velocity of the vehicle is below a threshold velocity, and sending the actuation signal further responsive at least in part to determining that the velocity of the vehicle is below the threshold velocity.

In an example embodiment, a method for controlling a sensor housing cleaning system includes determining a rotational speed of the transparent surface based at least in part on the level of obscurement of the transparent surface, determining a duration of rotation of the transparent surface based at least in part on the level of obscurement of the transparent surface, and sending an actuation signal that instructs the sensor housing cleaning system to cause the transparent surface to rotate at the determined rotational speed for the determined duration of rotation.

These and other features of the apparatuses, systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises," "comprising," "includes," "including," "contains," or "containing" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents and vice versa unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Described herein are sensor assembly cleaning systems and apparatuses that are adapted to rotate a transparent surface of a sensor assembly independently of a housing of the sensor assembly in order to disperse water, moisture, debris, or the like from the surface. The transparent surface may be a glass window that provides a camera of the sensor assembly with a field-of-view (FOV) of an external environment. Sensor data captured from various on-board vehicle sensors such as moisture data, image data, vehicle velocity data, or the like can be evaluated against various criteria to determine when and for how long to rotate the transparent surface. Sensor data can be evaluated over a period of time to identify patterns or trends relating to one or more vehicle parameters. An activation schedule for initiating and ceasing rotation of the transparent surface can be determined based on such patterns/trends.

A vehicle such as an autonomous vehicle may be provided with various on-board sensors including, for example, cameras, LiDAR systems, radar systems, GPS devices, sonar-based sensors, ultrasonic sensors, accelerometers, gyroscopes, magnetometers, IMUs, FIR sensors, or the like. The data collected by these sensors is used to facilitate a variety of autonomous vehicle operations. On-board vehicle sensors disposed on an exterior of a vehicle may be provided in or integrated with protective housing to protect the sensors from damage from the elements. More specifically, multiple sensors/types of sensors may be provided as part of a sensor assembly that is disposed, at least in part, on an exterior surface of an autonomous vehicle. At least some of the sensors in the sensor assembly may be encased within a protective housing.

As a non-limiting example, a sensor assembly may include, without limitation, one or more LiDARs and one or more cameras. The cameras may be housed within a protective enclosure/housing. The sensor assembly housing may also include one or more transparent surfaces such as glass windows. Each glass window may provide a corresponding camera within the housing with a FOV of an external environment. During vehicle operation, these glass windows can become obscured with debris such as dust, for example. In addition, when a vehicle is operated in wet conditions, water from various sources (e.g., water splashed up from the road surface, rain, etc.) can also obscure the glass surfaces. Obscurement of these transparent surfaces, whether from debris or rain or the like, can result in diminished function of the cameras due to diminished image quality of the image data captured by the cameras. This can be particularly dangerous for autonomous vehicles that rely on the images captured by such cameras to perform a variety of tasks critical to safe driverless vehicle operation such as object detection, object classification, object tracking, and the like. For example, clear image data is needed to accurately detect the distance between the vehicle and another vehicle and to determine a safe braking distance at the vehicle's current speed, to safely navigate around other vehicles on the road, and so forth.

Described herein are sensor assembly cleaning apparatuses, systems, and methods of operation thereof for causing a transparent surface of a sensor housing such as a camera window of a camera housing to rotate at a fast enough rotational speed to disperse debris; rain droplets or water droplets from other sources; condensation; or any other environmental contaminant from the window's surface. In an example embodiment, a sensor assembly cleaning apparatus/system includes a support component adapted to support a transparent surface such as a camera window of a camera housing. In an example embodiment, the support component may be a bearing to which the transparent surface is mounted. In an example embodiment, the sensor assembly cleaning apparatus/system further includes a component such as an electric motor assembly that is adapted to provide motive power to the support component in order to cause the transparent surface to rotate at a desired rotational speed. In this manner, clarity of the FOV provided through the transparent surface to a camera housed in the camera housing is ensured even under poor environmental conditions, and thus, performance of the camera's functions is enhanced. In addition, in an example embodiment, the support component and the component adapted to provide the motive power are located so as to provide a sensor with a substantially unobscured FOV through the transparent surface. In particular, because no components of the sensor assembly cleaning apparatus/system obscure the transparent surface, a sensor (e.g., a camera) can be positioned at or near a center axis of the transparent surface, thereby providing a more expansive FOV for the camera.

In another example embodiment, a computer-implemented method for controlling operation of a sensor assembly/housing cleaning apparatus/system is disclosed. The method includes receiving sensor data from various on-board vehicle sensors. The sensor data may include, without limitation, moisture data, image data, vehicle velocity data, or the like. In an example embodiment, the method further includes determining a level of obscurement of a transparent surface of a sensor housing based at least in part on the sensor data, and determining whether the level of obscurement exceeds a threshold level. If the transparent surface is obscured beyond the threshold level, an actuation signal may be sent from a controller to the sensor housing/assembly cleaning apparatus to cause the transparent surface to be rotated at a rotational speed sufficient to disperse liquid, debris, or the like from the transparent surface.

In an example embodiment, the method may further evaluate the vehicle velocity in relation to a threshold vehicle velocity. If the vehicle velocity is determined to be less than the threshold vehicle velocity—which may indicate that the vehicle velocity is insufficient to generate enough naturally circulating wind around the transparent surface to produce a desired dispersion effect—an actuation signal may be sent to the apparatus to initiate rotation of the transparent surface at a determined rotational speed. It should be appreciated that any discussion herein of a first value exceeding or being greater than a second value also encompasses the first value being greater than or equal to the second value. Similarly, it should be appreciated that any discussion herein of a first value being below or less than a second value also encompasses the first value being less than or equal to the second value.

In some example embodiments, the sensor data includes moisture data indicative of a moisture level of the transparent surface. If, for example, the vehicle is being operated in the rain, the moisture data may indicate a high moisture level due to rain droplets on the transparent surface. In this example embodiment, the level of obscurement may be correlated to the moisture level indicated by the moisture data. In other example embodiments, the sensor data includes image data captured by a camera encased in the camera housing. The image data may indicate an obscured view of the camera through the transparent surface (e.g., glass window of the camera housing). The transparent surface may become obscured by contaminants such as dust or debris or by liquid droplets or streams of liquid resulting from rain, splashed water from the road surface, or the like. Similar to the moisture level, the degree of impairment in the clarity of the image data may be indicative of the level of obscurement of the transparent surface. In particular, in some example embodiments, the level of obscurement of the transparent surface can be determined by comparing an image captured through the obscured surface to a baseline unobscured image.

In an example embodiment, the rotational speed at which to rotate the transparent surface and/or the duration of time that the transparent surface is to be rotated at that speed can be determined based on the level of obscurement of the transparent surface. For instance, the greater the degree of obscurement of the transparent surface, the greater the rotational speed and/or the long the duration of rotation. In addition, in an example embodiment, a computer-implemented method for controlling a sensor assembly cleaning apparatus/system includes determining, based on received sensor data, historical patterns/trends relating to one or more vehicle parameters such as, for example, vehicle velocity, vehicle acceleration, moisture on one or more vehicle surfaces, or the like. The method further includes determining an activation schedule for initiating and ceasing rotation of a transparent surface of the sensor assembly. The activation schedule may indicate a periodicity with which the transparent surface is to be rotated, a respective duration of time for each rotation, a respective rotational speed for each rotation, and so forth.

Example embodiments of the invention provide a number of technical solutions to technical problems faced by conventional apparatuses and methods for cleaning transparent surfaces of sensor assemblies. For example, some example embodiments of the invention are directed to an improved sensor assembly cleaning apparatus/system that addresses the technical problem of diminished sensor (e.g., camera) performance resulting from obscurement of a transparent surface of the sensor assembly - or more specifically a transparent surface of a housing for the sensor—by debris, dust, liquid droplets, liquid streams, or the like. The improved sensor assembly cleaning apparatus according to example embodiments of the invention addresses this technical problem by providing a novel and unconventional mechanism in the form of a rotatable transparent surface of the sensor assembly that is adapted to rotate independently of the housing in order to cause liquid, debris, or other objects to disperse from the surface due to the high rotational speed. This enhances sensor performance such as the quality of images captured by a camera through the transparent surface, and thus, represents a technological improvement over conventional sensor assembly cleaning techniques or apparatuses.

Moreover, in example embodiments, components of the sensor assembly cleaning apparatus including, for example, a support component to which the transparent surface may be mounted; a component that supplies motive power to the support component and the transparent surface; and one or more gears or other components adapted to transmit rotational force from the components that supplies the motive power to the support component and the transparent surface are positioned so as to substantially avoid obscuring the transparent surface. As such, a more expansive FOV is provided to a camera through the transparent surface, representing a technical solution to the technical problem of enabling rotation of the transparent surface without obstructing the FOV through the transparent surface.

In addition, certain example embodiments of the invention are directed to a method for controlling a sensor assembly cleaning apparatus according to which various parameters are evaluated against corresponding threshold levels/values to determine whether, for how long, and with what periodicity to activate the apparatus to cause a transparent surface of a housing of the sensor assembly to rotate. This capability to selectively activate the apparatus based on parameters such as these conserves power and reduces wear, and thus, constitutes a technological improvement.

Figure 1:
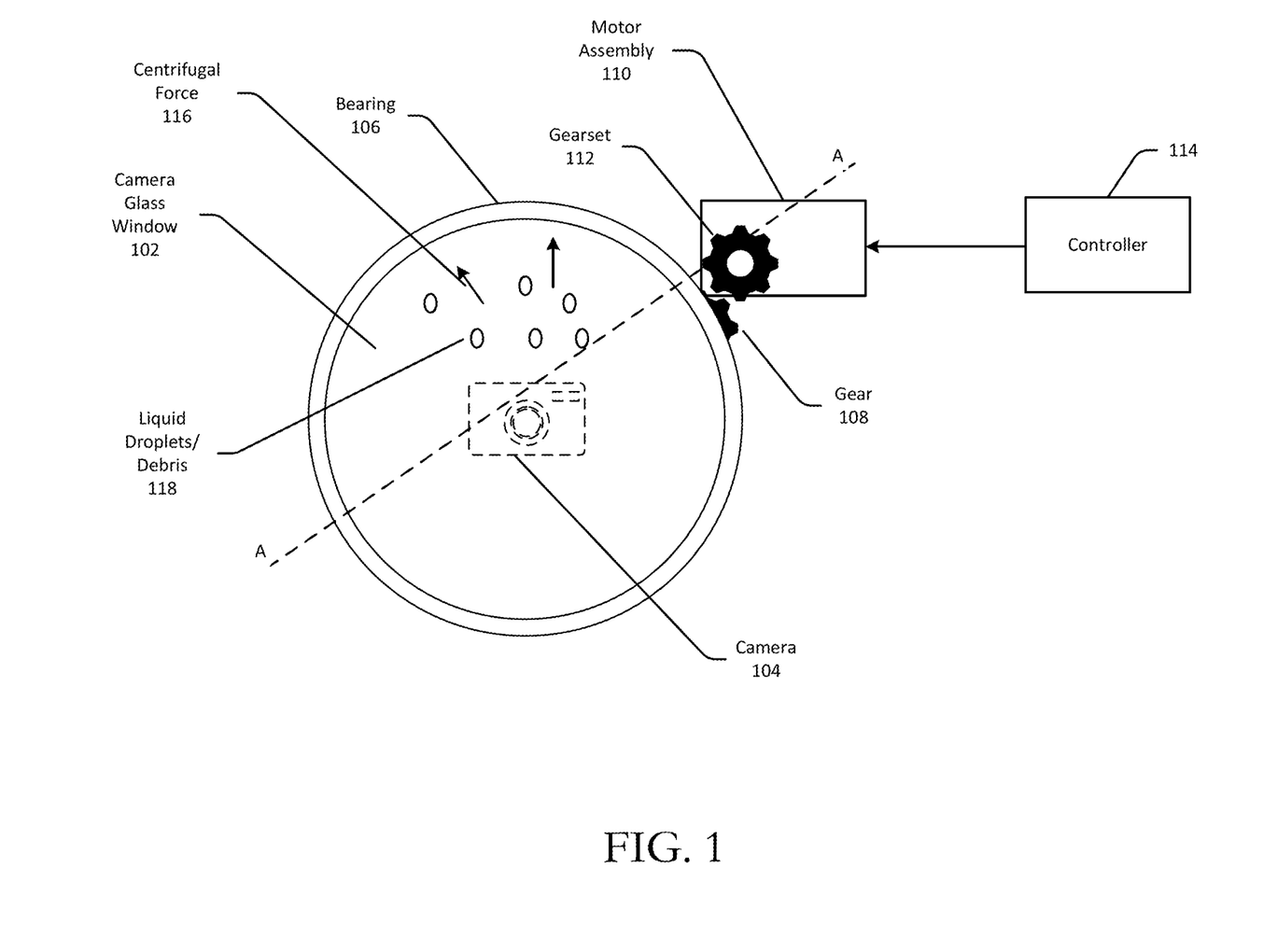
FIG. 1 schematically illustrates a top view of a rotating glass sensor cleaning system and associated sensor assembly components and vehicle components in accordance with an example embodiment of the invention.

FIG. 1 schematically illustrates a top view of a rotating glass sensor cleaning system and associated sensor assembly components and vehicle components in accordance with an example embodiment of the invention. FIG. 1 depicts a transparent surface 102. In example embodiments, the transparent surface 102 may form part of a housing of a sensor assembly (now shown in FIG. 1). The sensor assembly may be attached to an exterior of a vehicle such as an autonomous vehicle and may be integrated with one or more other vehicle systems. In an example embodiment, the housing of the sensor assembly may house one or more cameras. The housing may include multiple transparent surfaces (e.g., camera window 102) formed in side surfaces of the housing. In an example embodiment, each camera window may provide a respective one or more cameras in the housing with a FOV of an environment external to the housing. For example, the window 102 may provide a camera 104 with a FOV of an external environment. More specifically, in an example embodiment, each camera in the housing may capture image data of an external environment (e.g., a portion of a vehicle's surrounding environment) via a FOV provided by a corresponding transparent surface of the camera housing. In example embodiments, the sensor assembly may further include one or more other types of sensors such as, for example, a LiDAR system. Such other types of sensors may not be housed in the same housing that contains the cameras, but rather may be provided in a separate housing(s) or may not require protective housing.

Still referring to FIG. 1, the transparent surface 102 (e.g., camera glass window) may be mounted to a support component 106. In an example embodiment, the support component 106 may be a bearing to which the transparent surface 102 is mounted. The support component 106 may be any suitable type of bearing. In an example embodiment, the support component 106 and the transparent surface 102 may be adapted to rotate independently of the housing that contains the camera 104. In addition, in example embodiments, the support component 106 may be attached, affixed, or otherwise coupled to one or more gears 108 or the like.

In example embodiments, the rotating glass sensor assembly cleaning apparatus/system may further include a component 106 for providing motive power to the support component 106 to cause the transparent surface 102 to rotate at a desired rotational speed. In example embodiments, the component 106 may be an electric motor assembly or the like that includes an electric motor (not shown) and gearset 112. The electric motor may be powered by a source of electricity such as, for example, one or more batteries. The gearset 112 may include one or more gears in any combination/configuration. In example embodiments, the electric motor power assembly 110 may be adapted to supply motive power from the electric motor to the support component 106 via the gearset 112 and the gear 108. More specifically, the electric motor assembly 110 may be adapted to provide motive power from the electric motor, which the gearset 112 may transmit to the gear 108. In particular, one or more gears of the gearset 112 may include teeth that mesh with teeth of the gear 108. In this manner, motive power from the electric motor causes one or more gears of the gearset 112 to rotate, which in turn, causes the gear 108 to rotate. Rotation of the gear 108 causes the support component 106 and the transparent surface 102 to rotate via attachment of the support component 106 to the gear 108. In example embodiments, the transparent surface 102 and the support component 106 may be adapted to rotate together and independently of the sensor housing. It should be appreciated that an electric motor assembly is merely an example of the component 110 that provides the motive power. Other types of motors that operate on different principles and/or are powered by different power sources are also contemplated.

In example embodiments, a controller 114 may be configured to send an actuation signal to the rotating glass sensor assembly cleaning apparatus to cause the apparatus to initiate rotation of the transparent surface 102. The controller 114 may be any suitable type of control unit embodied in software, hardware, firmware, or a combination thereof. For example, the controller 114 may be an application specific integrated circuit, a field-programmable gate array, or some other customized computing chip or device. In example embodiments, the controller 114 may be an electronic control unit of a vehicle such as an autonomous vehicle. In response to receipt of an actuation signal from the controller 114, the electric motor assembly 110 may activate an electric motor, which may be configured to provide motive power that is transmitted to the support component 106 and the transparent surface 102 via interaction between the gearset 112 and the gear 108.

In example embodiments, the controller 114 may send a series of actuation signals ("ON" signals) and deactivation signals ("OFF" signals) to the motive power supply component 110 in accordance with an activation schedule that specifies a periodicity with which the transparent surface 102 is to be rotated, a duration of rotation, and a rotational speed. In response to receiving an actuation signal from the controller 114, the motive power supply component 110 may initiate rotation of the transparent surface 102 as described above. In example embodiments, rotation of the transparent surface 102 at a sufficient rotational speed for a sufficient duration of time causes liquid/debris 118 to disperse from the surface 102 due to the centrifugal force 116 that results from the rotation.

Figure 2:
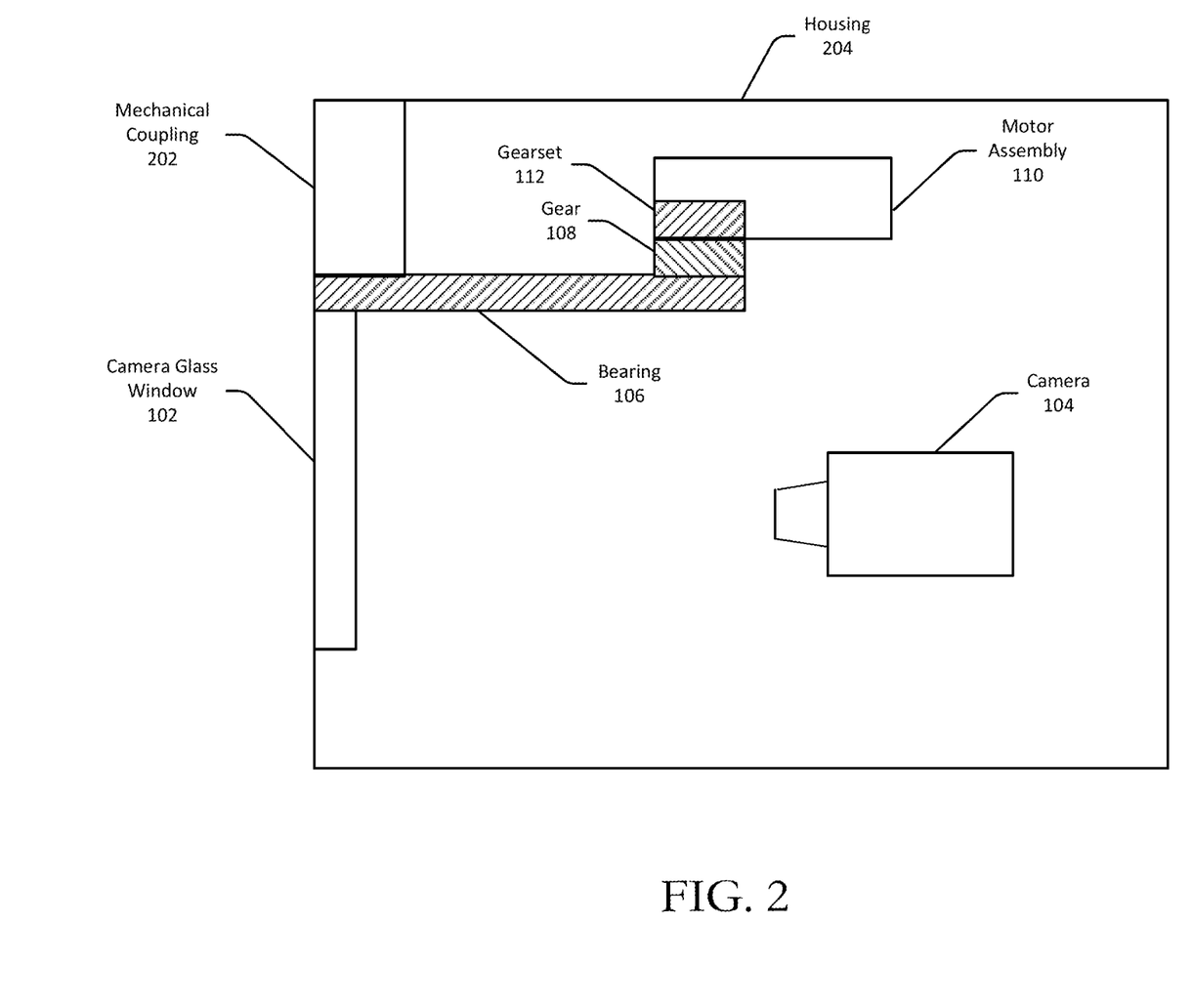
FIG. 2 is a side view of the rotating glass sensor cleaning system and associated sensor assembly components of FIG. 1 taken along cross-section 'A' in accordance with an example embodiment of the invention.

FIG. 2 is a side view of the rotating glass sensor cleaning system and associated sensor assembly components of FIG. 1 taken along cross-section 'A' in accordance with an example embodiment of the invention. As depicted in FIG. 2, the transparent surface 102 (e.g., a camera glass window) may be mounted to the support component 106, which may be a bearing. The bearing 106, in turn, may be mounted, attached, affixed, or otherwise coupled via a mechanical coupling 202 to a sensor housing 204 directly or via an intermediary component such as a bracket. As further depicted in FIG. 2, the camera 104 is provided with a FOV through the transparent surface 102. Because components of the rotating glass sensor assembly cleaning apparatus (e.g., the bearing 106, the motor assembly 110, the gear 108, etc.) are positioned so as not to obstruct the FOV through the transparent surface 102, the camera 104 can be positioned anywhere with respect to the transparent surface 102. In particular, the camera 104 can be positioned along a center axis of the transparent surface 102 to provide the most expansive FOV possible.

Figure 3:
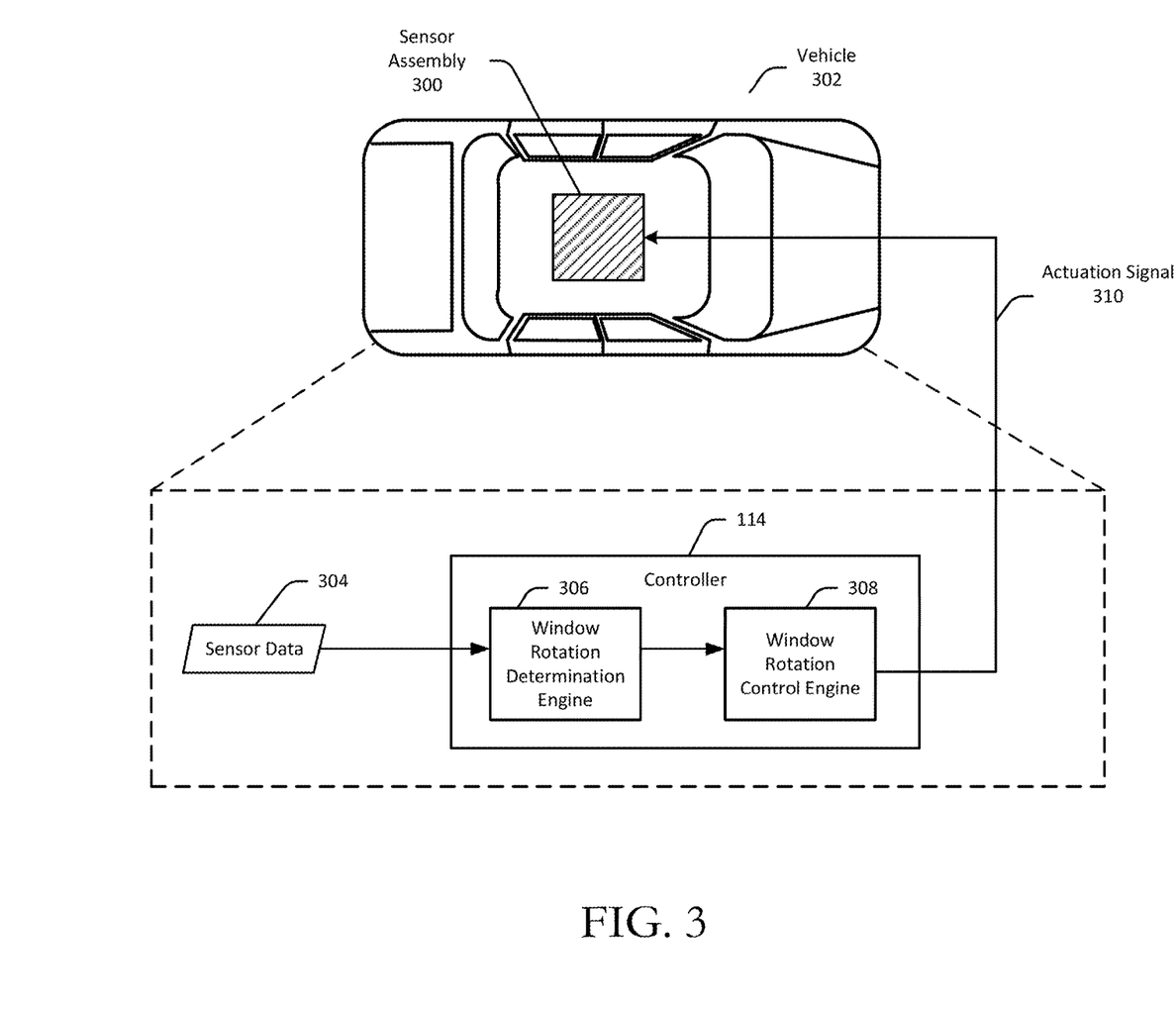
FIG. 3 is a schematic hybrid block and data flow diagram illustrating control of a rotating glass sensor cleaning system in accordance with an example embodiment of the invention.
Figure 4:
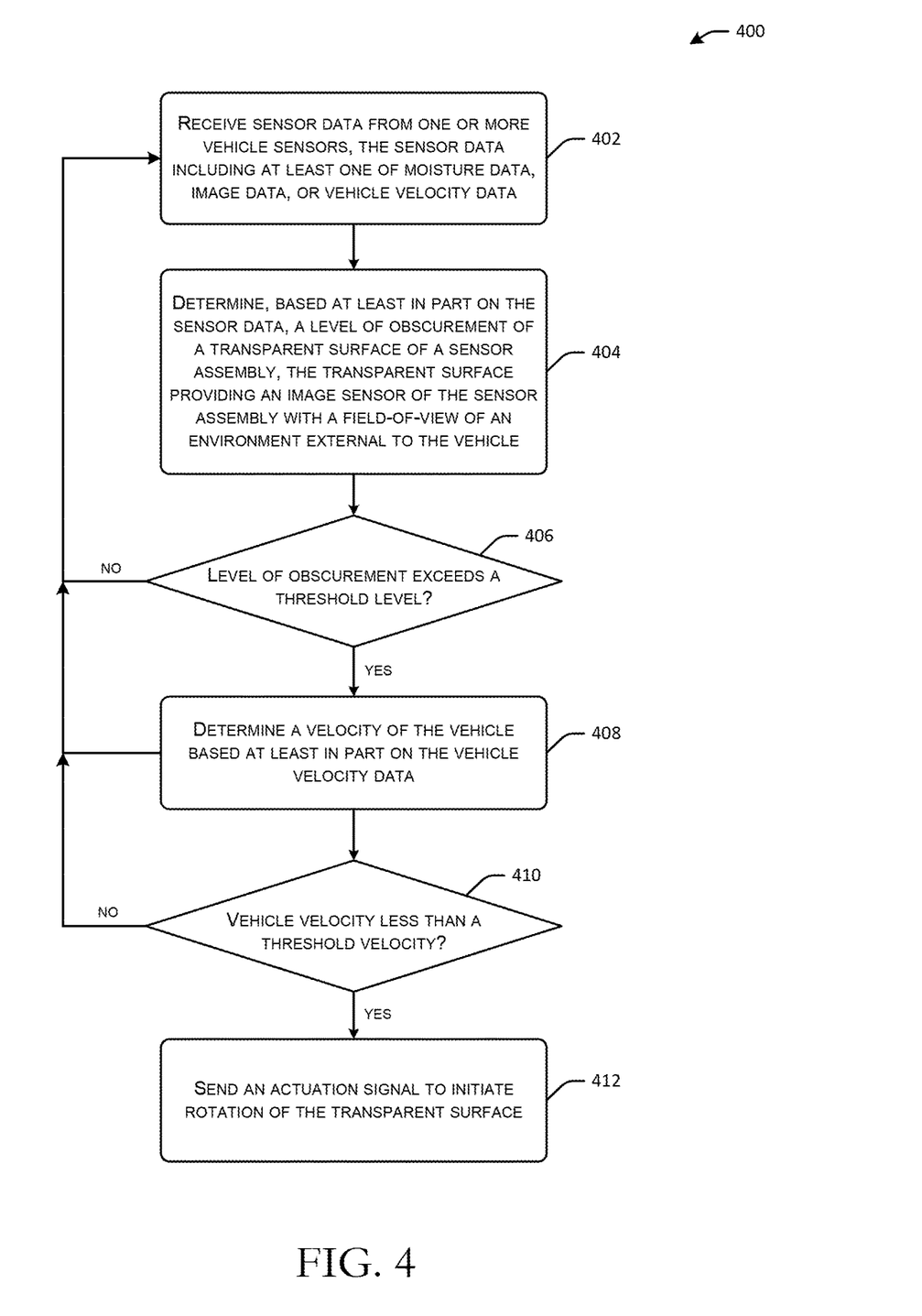
FIG. 4 is a process flow diagram of an illustrative method for controlling operation of a rotating glass sensor cleaning system in accordance with an example embodiment of the invention.
Figure 5:
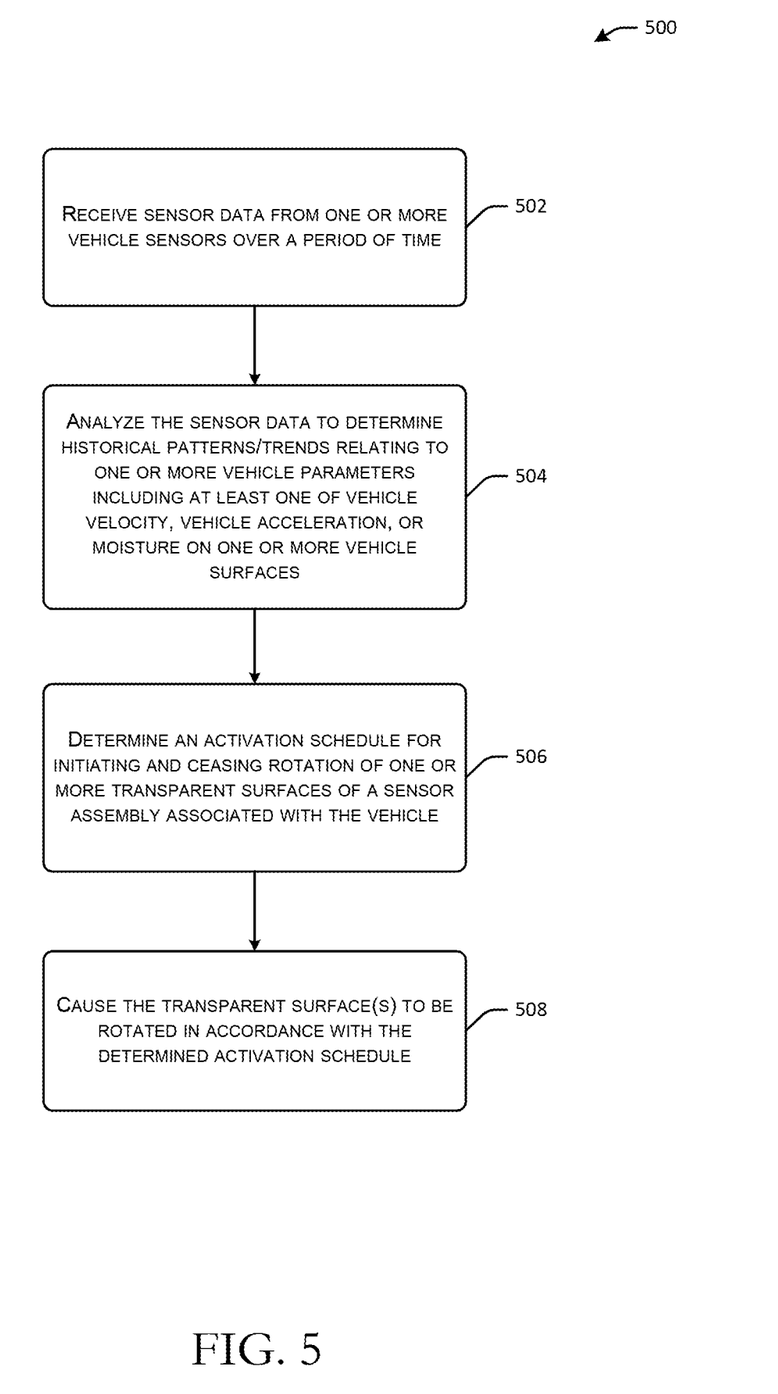
FIG. 5 is a process flow diagram of an illustrative method for determining an activation schedule for controlling operation of a rotating glass sensor cleaning system in accordance with an example embodiment of the invention.

FIG. 3 is a schematic hybrid block and data flow diagram illustrating control of a rotating glass sensor cleaning system in accordance with an example embodiment of the invention. FIG. 4 is a process flow diagram of an illustrative method 400 for controlling operation of a rotating glass sensor cleaning system in accordance with an example embodiment of the invention. FIG. 5 is a process flow diagram of an illustrative method 500 for determining an activation schedule for controlling operation of a rotating glass sensor cleaning system in accordance with an example embodiment of the invention. Each of FIG. 4 and FIG. 5 will be described in conjunction with FIG. 3, and at times FIG. 1, hereinafter.

Each operation of the method 400 and/or the method 500 (described in more detail later in this disclosure) can be performed by one or more of the engines depicted in FIG. 3 or FIG. 6. These engines can be implemented in any combination of hardware, software, and/or firmware. In certain example embodiments, one or more of these engines can be implemented, at least in part, as software and/or firmware modules that include computer-executable instructions that when executed by a processing circuit cause one or more operations to be performed. In example embodiments, these engines may be customized computer-executable logic implemented within a customized computing chip such as an FPGA or ASIC. A system or device described herein as being configured to implement example embodiments of the invention can include one or more processing circuits, each of which can include one or more processing units or cores. Computer-executable instructions can include computer-executable program code that when executed by a processing core can cause input data contained in or referenced by the computer-executable program code to be accessed and processed by the processing core to yield output data.

Referring now to FIG. 4 in conjunction with FIG. 3, at block 402 of the method 400, sensor data 304 is received from various sensors associated with a vehicle 302, which may be an autonomous vehicle. The sensor data 304 may include, for example, moisture data received from a moisture or rain sensor, image data captured by a camera (e.g., the camera 104) enclosed in a camera housing (e.g., the housing 204), vehicle velocity data, and so forth. The sensor data 304 may further include, without limitation, LiDAR data, radar data, and so forth. In example embodiments, the sensor data 304 may include one or both of the moisture data and the image data. Further, in example embodiments, the moisture data may be indicative of a moisture level of a transparent surface of a camera housing (e.g., the camera window 102). For instance, if the vehicle 302 is being operated in the rain, the moisture data may indicate a high moisture level due to the presence of rain droplets/streams of water on the transparent surface. In some example embodiments, the image data may reflect images captured by the camera 104 through the transparent surface 102. If the transparent surface 102 contains objects that obscure the camera's view (e.g., dust/other debris, liquid droplets, streams of liquid, etc.), then the image may be of poor quality.

At block 404 of the method 400, a window rotation determination engine 306 (which may be executing on a computing device such as an embedded controller (e.g., controller 114) provided locally in the vehicle 302 or on a remote server) may determine a level of obscurement of the transparent surface 102 based at least in part on the sensor data 304. For instance, in some example embodiments, the window rotation determination engine 306 may determine the level of obscurement based on moisture data that is indicative of a moisture level of the transparent surface 102. If, for example, the vehicle is being operated in the rain, the moisture data may indicate a high moisture level due to rain droplets on the transparent surface 102. The level of obscurement may be correlated to the moisture level indicated by the moisture data. For example, as the moisture level rises, the determined level of obscurement of the transparent surface 102 may proportionately rise as well.

In other example embodiments, the window rotation determination engine 306 may determine the level of obscurement based on image data included in the sensor data 304. The image data may indicate an obscured view of the camera 104 through the transparent surface 102. Similar to the moisture level, the degree of impairment in the clarity of the image data due to debris or liquid present on the transparent surface 102 may be indicative of the level of obscurement of the transparent surface. That is, as the degree of impairment in the clarity of the image data increases, the level of obscurement of the transparent surface 102 may proportionately increase. In example embodiments, the window rotation determination engine 306 may assess the level of obscurement of the transparent surface 102 by comparing an image quality of the image captured through the transparent surface 102 to a baseline image having at least a threshold level of image quality. The baseline image may represent the maximum level of obscurement of a transparent surface that is permitted to ensure safe autonomous vehicle operation. In other example embodiments, the baseline image may represent an ideal image with no obscurement of the transparent surface. In example embodiments, the window rotation determination engine 306 may determine the extent to which the image quality of the captured image deviates from the image quality of the baseline image, and may correlate this deviation to a corresponding level of obscurement of the transparent surface 102.

Then, at block 406 of the method 400, the window rotation determination engine 306 may determine whether the level of obscurement of the transparent surface 102 exceeds a threshold level. If the level of obscurement of the transparent surface 102 does not exceed the threshold value, a negative determination may be made at block 406, and the method 400 may continue iteratively from block 402, where additional sensor data is received. If, on the other hand, the transparent surface 102 is obscured beyond the threshold level (a positive determination at block 406), the method 400 may optionally further evaluate the vehicle velocity in relation to a threshold vehicle velocity. In other example embodiments, the level of obscurement of the transparent surface 102 and its relation to the threshold level may alone determine whether the rotating glass sensor assembly cleaning apparatus/system is activated. In still other example embodiments, the vehicle velocity and its relation to a threshold velocity may alone dictate whether the apparatus/system is activated.

In still other example embodiments, if only one of the above-described conditions is met (e.g., only the level of obscurement exceeds the threshold level or only the vehicle velocity is less than the threshold velocity), the deviation between the corresponding parameter and the threshold value may need to exceed a certain value in order for the apparatus to be triggered to cause the transparent surface 102 to rotate. For instance, in some example embodiments, if the vehicle velocity is above the threshold velocity, the level of obscurement of the transparent surface 102 may need to exceed the threshold level by more than a predetermined value (or vice versa) before the apparatus is activated to cause the transparent surface 102 to rotate. In some example embodiments, if, for example, the vehicle velocity exceeds the threshold velocity by an amount x, then the level of obscurement of the transparent surface 102 may need to exceed the threshold level by at least kx, where k is a multiplicative factor that can take on any real number value greater than 1, or vice versa.

In other example embodiments, rather than actuating the motor assembly 110 to initiate rotation of the transparent surface 102 when the level of obsurement of the surface 102 exceeds the threshold level, the apparatus may be triggered when the level of obscurement is within X % of the threshold level. Similarly, in some example embodiments, the apparatus may be triggered when the vehicle velocity is within Y % of the threshold velocity. In some other example embodiments, the rotational speed may be a function of how close the level of obscurement of the transparent surface 102 or the vehicle velocity is to the threshold obscurement level or threshold velocity, whichever the case may be. For instance, the rotational speed may be at a maximum permissible level if the level of obscurement exceeds the threshold and/or the vehicle velocity is below the threshold velocity. Then, for any level of obscurement less than the threshold level, the reduction in the maximum permissible rotational speed may be proportional to the difference between the level of obscurement and the threshold level. For instance, if the level of obscurement of the transparent surface 102 is 20% percent less than the threshold level, then rotational speed may be 80% of the maximum permissible level. Similarly, for any vehicle velocity above the threshold velocity, the reduction in the maximum permissible rotational speed may be proportional to the difference between the vehicle velocity and the threshold velocity. For instance, if the vehicle velocity is 20% percent above the threshold velocity, then the rotational speed may be 70% of the maximum permissible speed. It should be appreciated that the values of other parameters such as duration of rotation, number of independent rotations of the transparent surface 102 within a given amount of time, or the like may additionally, or alternatively, may be proportional to the deviation between a level of obscurement of the transparent surface 102 and a threshold level or the deviation between the vehicle velocity and a threshold velocity.

Referring again to FIG. 4, at block 408 of the method 400, the window rotation determination engine 306 may determine a velocity of the vehicle 302 from vehicle velocity data included in the sensor data 304. It should be appreciated that velocity, as that term is used herein, may simply connote a speed of the vehicle 302 (e.g., a scalar quantity) or a speed and a direction of the vehicle 302 (e.g., a vector quantity). Then, at block 410 of the method 400, the window rotation determination engine 306 may determine whether the velocity of the vehicle 302 is less than a threshold velocity. If the vehicle velocity is determined to be less than the threshold vehicle velocity (a positive determination at block 410)—which may indicate that the vehicle velocity is insufficient to generate enough naturally circulating wind around the transparent surface 102 to produce a desired cleaning effect—a window rotation control engine 310 may send an actuation signal 310 to the rotating glass sensor assembly cleaning apparatus at block 412 to initiate the rotation of the transparent surface 102. The window rotation control engine 308 may execute on a computing device such as an embedded controller (e.g., the controller 114) provided locally in the vehicle 302 or on a remote server.

FIG. 4 describes the data and criteria that are evaluated to determine whether to actuate a motive power supply component to cause a transparent surface of a sensor housing of a sensor assembly to rotate. FIG. 5 describes a process for determining an activation schedule that specifies when and for how long to initiate rotation of a transparent surface, or potentially, multiple transparent surfaces and in what order. In particular, in example embodiments, the activation schedule may specify the timing for initiating and ceasing rotation of various transparent surfaces and the duration of time and the rotational speed for each rotation of each transparent surface.

Referring now to FIG. 5, at block 502 of the method 500, the window rotation determination engine 306 may receive sensor data from one or more vehicle sensors over a period of time. The received sensor data may include the sensor data 302. The period of time may be selected so as to ensure that a sufficient amount of historical data is assessed at block 504 of the method 500. The sensor data received at block 502 may include data relating to one or more parameters associated with operation of the vehicle 302. The sensor data received at block 502 may include, without limitation, velocity data, acceleration data, rotational movement data, vibrational data, vehicle braking data, image data, moisture data, and so forth.

Then, at block 504 of the method 500, the window rotation determination engine 306 may analyze the received sensor data to determine historical patterns/trends present in the data. For example, in some example embodiments, the window rotation determination engine 306 may analyze the received sensor data to determine whether any historical moisture and/or vehicle velocity trends are present. For instance, if the moisture data indicates that moisture levels of the transparent surface 102 are continuously trending upwards but have not yet reached a level that would cause the level of obscurement of the transparent surface 102 to exceed the threshold level, the window rotation determination engine 306 may nonetheless determine that the apparatus should be activated to cause the transparent surface 102 to rotate in anticipation that the moisture levels will continue to rise and the level of obscurement will exceed the threshold level in the near future. The window rotation determination engine 306 may similarly evaluate the vehicle velocity data to determine if any similar trends are present in that data. For instance, if the velocity data indicates that the vehicle is continuously decelerating, the window rotation determination engine 306 may predict that the velocity of the vehicle will be below the threshold velocity in the near future, and as a result, may proactively trigger rotation of the transparent surface 102.

In certain example embodiments, the window rotation determination engine 306 may determine historical trends relating to, for example, the time of day or the driving conditions under which the transparent surface 102 is more likely to become obscured. For example, it may be determined that liquid/moisture tends to accumulate to a greater extent during certain days of the week, certain times of the day, certain elevations, certain geographic areas, and so forth. As another non-limiting example, the window rotation determination engine 306 may determine historical trends relating to other vehicle operating conditions such as driver behavior for a human operated vehicle or road conditions, traffic conditions, routes taken, or the like for autonomous vehicles.

Then, at block 506 of the method 500, the window rotation determination engine 306 may determine an activation schedule for initiating and ceasing rotation of the transparent surface 102. In particular, the engine 306 may determine the activation schedule based on the historical patterns/trends identified at block 504. That is, in some example embodiments, rather than dynamically triggering the apparatus when the level of obscurement of the transparent surface 102 exceeds a threshold level and/or the vehicle velocity is below the threshold velocity, the transparent surface 102 may be caused to rotate in accordance with a predetermined activation schedule. The activation schedule may be determined based on the identified historical patterns/trends relating to one or more vehicle parameters. It should be appreciated, however, that the activation schedule can be updated to reflect changes in the patterns/trends and/or based on dynamic changes to the vehicle operating conditions. Finally, at block 508 of the method 500, the window rotation control engine 308 may send an actuation signal (or multiple actuation and deactivation signals) to cause the rotating glass sensor assembly cleaning apparatus to operate in accordance with the determined activation schedule.

As a non-limiting example of determining an activation schedule based on historical patterns/trends, if a driver tends to operate a vehicle at higher speeds in wet conditions, it may not be necessary to initiate rotation of the transparent surface 102 as long, at as high a rotational speed, or for as long as it may be in a scenario involving a driver who tends to operate a vehicle at slower speeds in wet conditions. As another illustrative example, a vehicle that tends to be operated in wetter or dirtier environments may be associated with an activation schedule that involves rotating the transparent surface 102 a greater number of times during a given time period; at a higher rotational speed; and/or for a longer duration. As yet another illustrative example, if the vehicle 302 tends to be operated in high traffic areas and/or during peak traffic times, and thus, tends to operate at a lower average velocity, the corresponding activation schedule for the vehicle 302 may specify that the transparent surface 102 be rotated a greater number of times during a given time period; at a higher rotational speed; and/or for a longer duration. It should be appreciated that numerous other historical patterns/trends as well as corresponding activation schedules are contemplated.

In some example embodiments, the sensor housing of the sensor assembly 300 may include multiple transparent surfaces, at least some of which may be located adjacent to one another. In certain example embodiments, the determined activation schedule may also specify an order in which the transparent surfaces are to be rotated in order to avoid or mitigate scenarios in which rotation of a particular transparent surface causes liquid/debris thereon to impinge and adhere to another transparent surface. In order to avoid this scenario, an example activation schedule may specify that two transparent surfaces determined to be adjacent to one another should be rotated during time periods that at least partially overlap. In other example embodiments, it may be desirable to rotate the transparent surfaces in succession during non-overlapping time periods. For example, this activation schedule may selected in order to allow for any liquid/debris that lands on a second surface as a result of rotation of the first surface to be subsequently removed by rotating the second surface during a non-overlapping time period.

In example embodiments, the activation schedule may be further determined based on an associated pressure drop that would occur when rotating multiple transparent surfaces simultaneously. For instance, in some example embodiments, it may not be desirable to rotate all or greater than some threshold number of transparent surfaces simultaneously because this may produce a potentially detrimental pressure drop. More specifically, in some example embodiments, the maximum permissible number of transparent surfaces that can be rotated simultaneously in order to maintain an acceptable pressure drop may be determined, and the activation schedule may ensure that this number is not exceeded.

Hardware Implementation

Figure 6:
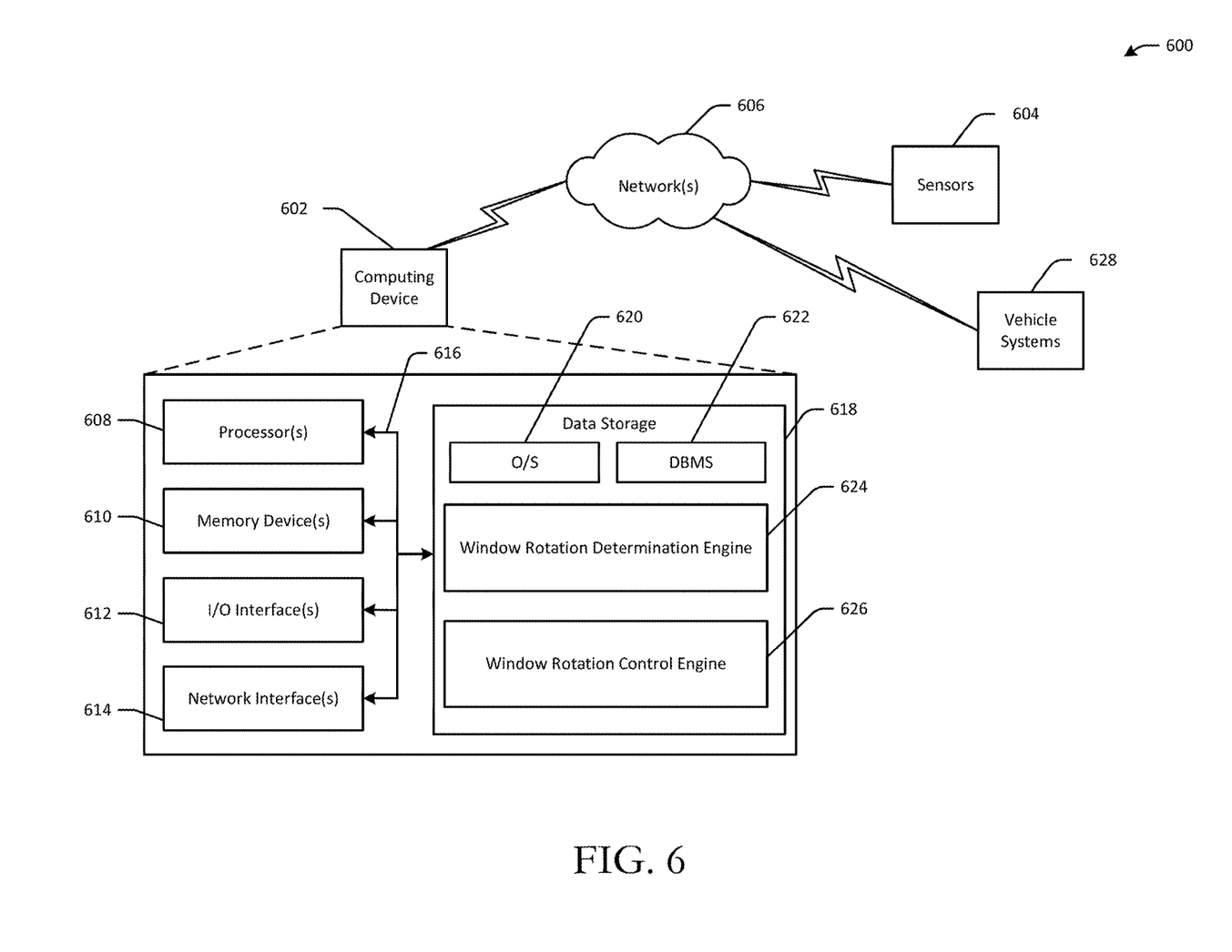
FIG. 6 is a schematic block diagram illustrating an example networked architecture configured to implement example embodiments of the invention.

FIG. 6 is a schematic block diagram illustrating an example networked architecture 600 configured to implement example embodiments of the invention. The networked architecture 600 can include one or more special-purpose computing devices 602 communicatively coupled via one or more networks 606 to various sensors 604 and other vehicle systems 628. In example embodiments, the sensors 604 may include any of the example types of on-board vehicle sensors previously described including, without limitation, LiDAR sensors, radars, cameras, GPS receivers, sonar-based sensors, IMUs, accelerometers, gyroscopes, magnetometers, FIR sensors, and so forth. The special-purpose computing device(s) 602 may include devices that are integrated with a vehicle and may receive sensor data from the sensors 604 via a local network connection (e.g., WiFi, Bluetooth, Dedicated Short Range Communication (DSRC), or the like). In other example embodiments, the special-purpose computing device(s) 602 may be provided remotely from a vehicle and may receive the sensor data from the sensors 604 via one or more long-range networks. The vehicle system(s) 628 may include sensor assembly cleaning apparatuses described herein. Further, the vehicle system(s) 628 may additionally include an in-vehicle infotainment system or other mechanical and/or electrical systems of a vehicle.

The special-purpose computing device(s) 602 may be hard-wired to perform the techniques described herein; may include circuitry or digital electronic devices such as one or more ASICs or FPGAs that are persistently programmed to perform the techniques; and/or may include one or more hardware processors programmed to perform the techniques pursuant to program instructions in firmware, memory, other storage, or a combination thereof. The special-purpose computing device(s) 602 may also combine custom hard-wired logic, ASICs, or FPGAs with custom programming to accomplish the techniques. The special-purpose computing device(s) 602 may be desktop computer systems, server computer systems, portable computer systems, handheld devices, networking devices or any other device or combination of devices that incorporate hard-wired and/or programmed logic to implement the techniques.

The special-purpose computing device(s) may be generally controlled and coordinated by operating system software 620, such as iOS, Android, Chrome OS, Windows XP, Windows Vista, Windows 7, Windows 6, Windows Server, Windows CE, Unix, Linux, SunOS, Solaris, iOS, Blackberry OS, VxWorks, or other compatible operating systems. In other embodiments, the computing device(s) 602 may be controlled by a proprietary operating system. The operating system software 620 may control and schedule computer processes for execution; perform memory management; provide file system, networking, and I/O services; and provide user interface functionality, such as a graphical user interface ("GUI").

While the computing device(s) 602, the sensors 604, and/or the vehicle system(s) 626 may be described herein in the singular, it should be appreciated that multiple instances of any such component can be provided and functionality described in connection any particular component can be distributed across multiple instances of such a component. In certain example embodiments, functionality described herein in connection with any given component of the architecture 600 can be distributed among multiple components of the architecture 600. For example, at least a portion of functionality described as being provided by a computing device 602 may be distributed among multiple such computing devices 602.

The network(s) 606 can include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 606 can have any suitable communication range associated therewith and can include, for example, global networks (e.g., the Internet), metropolitan area networks (MANs), wide area networks (WANs), local area networks (LANs), or personal area networks (PANs). In addition, the network(s) 606 can include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 602 can include one or more processors (processor(s)) 606, one or more memory devices 610 (generically referred to herein as memory 610), one or more input/output ("I/O") interface(s) 612, one or more network interfaces 614, and data storage 616. The computing device 602 can further include one or more buses 616 that functionally couple various components of the computing device 602. The computing device 602 may also include various engines including a window rotation determination engine 624 and a window rotation control engine 626. These engines may be implemented in any combination of software, hardware, or firmware. While these engines are illustratively depicted as software/firmware modules stored in the data storage 616, it should be appreciated that the engines may include hard-wired logic, customized logic of a persistently programmed customized computing device such as an ASIC or FPGA, or the like. Each of the engines may include logic for performing any of the processes and tasks described earlier in connection with correspondingly named engines.

The bus(es) 616 can include at least one of a system bus, a memory bus, an address bus, or a message bus, and can permit the exchange of information (e.g., data (including computer-executable code), signaling, etc.) between various components of the computing device 602. The bus(es) 616 can include, without limitation, a memory bus or a memory controller, a peripheral bus, an accelerated graphics port, and so forth. The bus(es) 616 can be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 610 can include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, can include non-volatile memory. In certain example embodiments, volatile memory can enable faster read/write access than non-volatile memory. However, in certain other example embodiments, certain types of non-volatile memory (e.g., FRAM) can enable faster read/write access than certain types of volatile memory.

In various implementations, the memory 610 can include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 610 can include main memory as well as various forms of cache memory such as instruction cache(s), data cache(s), translation lookaside buffer(s) (TLBs), and so forth. Further, cache memory such as a data cache can be a multi-level cache organized as a hierarchy of one or more cache levels (L1, L2, etc.).

The data storage 616 can include removable storage and/or non-removable storage including, but not limited to, magnetic storage, optical disk storage, and/or tape storage. The data storage 616 can provide non-volatile storage of computer-executable instructions and other data. The memory 610 and the data storage 616, removable and/or non-removable, are examples of computer-readable storage media (CRSM) as that term is used herein. The data storage 616 can store computer-executable code, instructions, or the like that can be loadable into the memory 610 and executable by the processor(s) 606 to cause the processor(s) 606 to perform or initiate various operations. The data storage 616 can additionally store data that can be copied to memory 610 for use by the processor(s) 606 during the execution of the computer-executable instructions. Moreover, output data generated as a result of execution of the computer-executable instructions by the processor(s) 606 can be stored initially in memory 610 and can ultimately be copied to data storage 616 for non-volatile storage.

More specifically, the data storage 616 can store one or more operating systems (O/S) 620 and one or more database management systems (DBMS) 622 configured to access the memory 610 and/or one or more external datastore(s) potentially via one or more of the networks 606. In addition, the data storage 616 may further store one or more program modules, applications, engines, computer-executable code, scripts, or the like. For instance, any of the engines described herein may be implemented as software and/or firmware that includes computer-executable instructions (e.g., computer-executable program code) loadable into the memory 610 for execution by one or more of the processor(s) 606 to perform any of the techniques described herein.

Although not depicted in FIG. 6, the data storage 616 can further store various types of data utilized by engines of the computing device 602. Such data may include, without limitation, sensor data (e.g., temperature data, vehicle velocity data, moisture data, etc.); map data; threshold values; and so forth. Any data stored in the data storage 616 can be loaded into the memory 610 for use by the processor(s) 606 in executing computer-executable program code. In addition, any data stored in the data storage 616 can potentially be stored in one or more external datastores that are accessible via the DBMS 622 and loadable into the memory 610 for use by the processor(s) 606 in executing computer-executable instructions/program code.

The processor(s) 606 can be configured to access the memory 610 and execute computer-executable instructions/program code loaded therein. For example, the processor(s) 606 can be configured to execute computer-executable instructions/program code of the various program modules to cause or facilitate various operations to be performed in accordance with one or more embodiments of the invention. The processor(s) 606 can include any suitable processing unit capable of accepting data as input, processing the input data in accordance with stored computer-executable instructions, and generating output data. The processor(s) 606 can include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 606 can have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 606 can be made capable of supporting any of a variety of instruction sets.

Referring now to other illustrative components depicted as being stored in the data storage 616, the O/S 620 can be loaded from the data storage 616 into the memory 610 and can provide an interface between other application software executing on the computing device 602 and hardware resources of the computing device 602. More specifically, the 0/S 620 can include a set of computer-executable instructions for managing hardware resources of the computing device 602 and for providing common services to other application programs. In certain example embodiments, the O/S 620 can include or otherwise control execution of one or more of the program modules stored in the data storage 616. The O/S 620 can include any operating system now known or which can be developed in the future including, but not limited to, any server operating system, any mainframe operating system, or any other proprietary or non-proprietary operating system.

The DBMS 622 can be loaded into the memory 610 and can support functionality for accessing, retrieving, storing, and/or manipulating data stored in the memory 610, data stored in the data storage 616, and/or data stored in external datastore(s). The DBMS 622 can use any of a variety of database models (e.g., relational model, object model, etc.) and can support any of a variety of query languages. The DBMS 622 can access data represented in one or more data schemas and stored in any suitable data repository. Datastore(s) that may be accessible by the computing device 602 via the DBMS 622, can include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 602, the input/output (I/O) interface(s) 612 can facilitate the receipt of input information by the computing device 602 from one or more I/O devices as well as the output of information from the computing device 602 to the one or more I/O devices. The I/O devices can include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components can be integrated into the computing device 602 or can be separate therefrom. The I/O devices can further include, for example, any number of peripheral devices such as data storage devices, printing devices, and so forth.

The I/O interface(s) 612 can also include an interface for an external peripheral device connection such as universal serial bus (USB), FireWire, Thunderbolt, Ethernet port or other connection protocol that can connect to one or more networks. The I/O interface(s) 612 can also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 602 can further include one or more network interfaces 614 via which the computing device 602 can communicate with any of a variety of other systems, platforms, networks, devices, and so forth. The network interface(s) 614 can enable communication, for example, with the sensors 604 and/or one or more other devices via one or more of the network(s) 606. In example embodiments, the network interface(s) 614 provide a two-way data communication coupling to one or more network links that are connected to one or more of the network(s) 606. For example, the network interface(s) 614 may include an integrated services digital network (ISDN) card, a cable modem, a satellite modem, or a modem to provide a data communication connection to a corresponding type of telephone line. As another non-limiting example, the network interface(s) 614 may include a local area network (LAN) card to provide a data communication connection to a compatible LAN (or a wide area network (WAN) component to communicate with a WAN). Wireless links may also be implemented. In any such implementation, the network interface(s) 614 may send and receive electrical, electromagnetic, or optical signals that carry digital data streams representing various types of information.

A network link typically provides data communication through one or more networks to other data devices. For example, a network link may provide a connection through a local network to a host computer or to data equipment operated by an Internet Service Provider (ISP). The ISP, in turn, may provide data communication services through the world wide packet data communication network now commonly referred to as the "Internet". Local networks and the Internet both use electrical, electromagnetic, or optical signals that carry digital data streams. The signals through the various network(s) 604 and the signals on network links and through the network interface(s) 614, which carry the digital data to and from the computing device 602, are example forms of transmission media. In example embodiments, the computing device 602 can send messages and receive data, including program code, through the network(s) 606, network links, and network interface(s) 614. For instance, in the Internet example, a server might transmit a requested code for an application program through the Internet, the ISP, a local network, and a network interface 614. The received code may be executed by a processor 606 as it is received, and/or stored in the data storage 616, or other non-volatile storage for later execution.

It should be appreciated that the engines depicted in FIG. 6 as part of the computing device 602 are merely illustrative and not exhaustive. In particular, functionality can be modularized in any suitable manner such that processing described as being supported by any particular engine can alternatively be distributed across multiple engines, program modules, components, or the like, or performed by a different engine, program module, component, or the like. Further, one or more depicted engines may or may not be present in certain embodiments, while in other embodiments, additional engines not depicted can be present and can support at least a portion of the described functionality and/or additional functionality. In addition, various engine(s), program module(s), script(s), plug-in(s), Application Programming Interface(s) (API(s)), or any other suitable computer-executable code hosted locally on the computing device 602 and/or hosted on other computing device(s) accessible via one or more of the network(s) 606, can be provided to support functionality provided by the engines depicted in FIG. 6 and/or additional or alternate functionality. In addition, engines that support functionality described herein can be implemented, at least partially, in hardware and/or firmware and can be executable across any number of computing devices 602 in accordance with any suitable computing model such as, for example, a client-server model, a peer-to-peer model, and so forth.

It should further be appreciated that the computing device 602 can include alternate and/or additional hardware, software, and/or firmware components beyond those described or depicted without departing from the scope of the invention. More particularly, it should be appreciated that software, firmware, and/or hardware components depicted as forming part of the computing device 602 are merely illustrative and that some components may or may not be present or additional components may be provided in various embodiments. It should further be appreciated that each of the engines depicted and described represent, in various embodiments, a logical partitioning of supported functionality. This logical partitioning is depicted for ease of explanation of the functionality and may or may not be representative of the structure of software, hardware, and/or firmware for implementing the functionality.

In general, the terms engine, program module, or the like, as used herein, refer to logic embodied in hardware, firmware, and/or circuitry, or to a collection of software instructions, possibly having entry and exit points, written in a programming language, such as, for example, Java, C or C++. A software engine/module may be compiled and linked into an executable program, installed in a dynamic link library, or may be written in an interpreted programming language such as, for example, BASIC, Perl, or Python. It will be appreciated that software engines/modules may be callable from other engines/modules or from themselves, and/or may be invoked in response to detected events or interrupts. Software engines/modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. "Open source" software refers to source code that can be distributed as source code and/or in compiled form, with a well-publicized and indexed means of obtaining the source, and optionally with a license that allows modifications and derived works. Software instructions may be embedded in firmware and stored, for example, on flash memory such as erasable programmable read-only memory (EPROM). It will be further appreciated that hardware modules/engines may include connected logic units, such as gates and flip-flops, and/or may be further include programmable units, such as programmable gate arrays or processors.

Example embodiments are described herein as including engines or program modules. Such engines/program modules may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a field programmable gate array (FPGA) or an application specific integrated circuit (ASIC). A hardware engine may also include programmable logic or circuitry that is temporarily configured by software to perform certain operations. For example, a hardware engine may include a general-purpose processor or other programmable processor configured by software, in which case, the configured processor becomes a specific machine uniquely tailored to perform the configured functions and no longer constitute general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the term "engine" or "program module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware engines are temporarily configured (e.g., programmed), each of the hardware engines need not be configured or instantiated at any one instance in time. For example, where a hardware engine includes a general-purpose processor configured by software to become a special-purpose processor, the general-purpose processor may be configured as respectively different special-purpose processors (e.g., comprising different hardware engines) at different times. Software accordingly can configure a particular processor or processors, for example, to constitute a particular hardware engine at a given instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute an implementation of a hardware engine. Similarly, the methods described herein may be at least partially processor-implemented, with a particular processor or processors being an example of hardware. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations of example methods described herein may be distributed among multiple processors, not only residing within a single machine, but deployed across a number of machines. In some example embodiments, the processors may be located in a single geographic location (e.g., within a home environment, an office environment, or a server farm). In other example embodiments, the processors may be distributed across a number of geographic locations.

The present invention may be implemented as a system, a method, and/or a computer program product. The computer program product may include a computer readable storage medium (or media) having computer readable program instructions embodied thereon for causing a processor to carry out aspects of the present invention.

The computer readable storage medium is a form of non-transitory media, as that term is used herein, and can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. The computer readable storage medium, and non-transitory media more generally, may include non-volatile media and/or volatile media. A non-exhaustive list of more specific examples of a computer readable storage medium includes the following: a portable computer diskette such as a floppy disk or a flexible disk; a hard disk; a random access memory (RAM), a read-only memory (ROM), an erasable programmable read-only memory (EPROM or Flash memory), a static random access memory (SRAM), or any other memory chip or cartridge; a portable compact disc read-only memory (CD-ROM); a digital versatile disk (DVD); a memory stick; a solid state drive; magnetic tape or any other magnetic data storage medium; a mechanically encoded device such as punch-cards or raised structures in a groove having instructions recorded thereon or any physical medium with patterns of holes; any networked versions of the same; and any suitable combination of the foregoing.

Non-transitory media is distinct from transmission media, and thus, a computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Non-transitory media, however, can operate in conjunction with transmission media. In particular, transmission media may participate in transferring information between non-transitory media. For example, transmission media can include coaxial cables, copper wire, and/or fiber optics, including the wires that include at least some of the bus(es) XXX. Transmission media can also take the form of acoustic or light waves, such as those generated during radio-wave and infra-red data communications.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider (ISP)). In some embodiments, electronic circuitry including, for example, programmable logic circuitry, FPGAs, or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The various features and processes described above may be used independently of one another or may be combined in various ways. All possible combinations and sub-combinations are intended to fall within the scope of the invention. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed partially, substantially, or entirely concurrently, or the blocks may sometimes be executed in the reverse order, depending upon the functionality involved.

It should be emphasized that many variations and modifications may be made to the above-described embodiments, the elements of which are to be understood as being among other example embodiments of the invention. All such modifications and variations are intended to be included herein within the scope of the invention. While example embodiments of the invention may be referred to herein, individually or collectively, by the term "invention," this is merely for convenience and does not limit the scope of the invention to any single disclosure or concept if more than one is, in fact, disclosed. The foregoing description details certain embodiments of the invention. It will be appreciated, however, that no matter how detailed the foregoing appears in text, the invention can be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

The embodiments illustrated herein are described in sufficient detail to enable those skilled in the art to practice the teachings disclosed. Other embodiments may be used and derived therefrom, such that structural and logical substitutions and changes may be made without departing from the scope of the invention. The Detailed Description, therefore, is not to be taken in a limiting sense, and the scope of various embodiments is defined only by the appended claims, along with the full range of equivalents to which such claims are entitled.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

As used herein, the term "or" may be construed in either an inclusive or exclusive sense. Moreover, plural instances may be provided for resources, operations, or structures described herein as a single instance. Additionally, boundaries between various resources, operations, program modules, engines, and/or datastores are somewhat arbitrary, and particular operations are illustrated in a context of specific illustrative configurations. Other allocations of functionality are envisioned and may fall within a scope of various embodiments of the invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the invention as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

What is claimed is:

1. An apparatus, comprising:
a support that supports a transparent surface of a sensor housing; and
an electric motor assembly that provides motive power to the support to cause the transparent surface to rotate; and
a controller comprising a computing chip or device that transmits a series of actuation signals to the electric motor assembly to cause the transparent surface to rotate for a given duration, a given periodicity, and a given speed based on moisture data and image data indicating a degree of obscurity of the transparent surface.

2. The apparatus of claim 1, wherein the apparatus further comprises a gear coupled to the support, and wherein the electric motor assembly comprises a gearset adapted to mesh with the gear to cause the motive power to be transferred from the gearset to the support via the gear.

3. The apparatus of claim 1, wherein the support is a bearing, and wherein the transparent surface is mounted to the bearing.

4. The apparatus of claim 3, wherein the bearing is mounted to the sensor housing or to a component attached to the sensor housing.

5. The apparatus of claim 1, wherein the sensor housing is a camera housing that encloses a plurality of cameras, and wherein the transparent surface provides at least one of the plurality of cameras with a field-of-view of an environment external to the camera housing.

6. The apparatus of claim 5, wherein the sensor housing forms part of a sensor assembly that is mounted on a vehicle, and wherein the transparent surface is a glass camera window that provides the at least one of the plurality of cameras with the field-of-view of the environment external to the vehicle.

7. The apparatus of claim 1, wherein the transparent surface is adapted to rotate independently of the sensor housing.

8. The apparatus of claim 1, wherein the support and the component adapted to provide the motive power are located so as to provide a substantially unobscured field-of-view through the transparent surface for a sensor housed in the sensor housing.

9. The apparatus of claim 1, further comprising:
a sensor housing comprising transparent surfaces; and wherein:
the an electric motor assembly provides motive power to the support component to cause the transparent surfaces to rotate; and
the controller transmits actuation signals to the electric motor assembly to cause adjacent transparent surfaces to rotate during non-overlapping time periods.

10. The apparatus of claim 1, wherein the controller transmits the series of actuation signals based on a predicted moisture level and a predicted degree of obscurity of the transparent surface.

* * * * *